United States Patent  
Cloft

(10) Patent No.: US 9,828,105 B2
(45) Date of Patent: Nov. 28, 2017

(54) NACELLE ASSEMBLY HAVING INTEGRATED AFTERBODY MOUNT CASE

(75) Inventor: Thomas G. Cloft, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 1666 days.

(21) Appl. No.: 13/216,281

(22) Filed: Aug. 24, 2011

(65) Prior Publication Data

US 2013/0052005 A1 Feb. 28, 2013

(51) Int. Cl.
*B64D 29/06* (2006.01)
*F01D 25/28* (2006.01)
*B64D 27/26* (2006.01)
*F02C 7/20* (2006.01)

(52) U.S. Cl.
CPC ............. *B64D 29/06* (2013.01); *B64D 27/26* (2013.01); *F01D 25/28* (2013.01); *F02C 7/20* (2013.01); *B64D 2027/268* (2013.01); *Y02T 50/672* (2013.01)

(58) Field of Classification Search
CPC .......... F01D 25/26; F01D 25/28; F01D 25/30; B64D 29/06; B64D 27/26; B64D 2027/268; F02C 7/20; Y02T 50/672
USPC ................................ 415/211.2, 220
See application file for complete search history.

(56) References Cited

U.S. PATENT DOCUMENTS

| | | | |
|---|---|---|---|
| 4,132,069 A | | 1/1979 | Adamson et al. |
| 5,064,144 A | * | 11/1991 | Chee ................. 244/54 |
| 5,452,575 A | | 9/1995 | Freid |
| 5,524,847 A | * | 6/1996 | Brodell et al. ............ 244/54 |
| 5,864,922 A | * | 2/1999 | Kraft ..................... 16/266 |
| 6,474,597 B1 | | 11/2002 | Cazenave |
| 6,516,606 B2 | | 2/2003 | Fournier et al. |
| 7,797,922 B2 | | 9/2010 | Eleftheriou et al. |
| 8,313,293 B2 | * | 11/2012 | Heyerman et al. ........ 415/213.1 |
| 2009/0314881 A1 | | 12/2009 | Suciu et al. |

FOREIGN PATENT DOCUMENTS

| | | |
|---|---|---|
| EP | 1541468 B1 | 3/2007 |
| EP | 1847457 A2 | 10/2007 |
| EP | 1902951 A1 | 3/2008 |
| EP | 2251540 A2 | 11/2010 |
| FR | 2928181 A1 | 9/2009 |
| GB | 2434836 B | 10/2008 |
| WO | 2010007226 A2 | 1/2010 |
| WO | WO 2010007226 A2 * | 1/2010 |

OTHER PUBLICATIONS

WIPO, Machine Translation of WO 2010/007226 A2 to English, Jan. 29, 2014.*
Extended European Search Report for European Application No. EP 12 18 1549 dated Oct. 11, 2013.

* cited by examiner

Primary Examiner — Dwayne J White
Assistant Examiner — Adam W Brown
(74) Attorney, Agent, or Firm — Carlson, Gaskey & Olds

(57) ABSTRACT

A nacelle assembly for a gas turbine engine includes an integrated afterbody mount case. The integrated afterbody mount case includes an outer ring and a plurality of spokes that extend radially inwardly from the outer ring. The outer ring includes a radially outer surface and a radially inner surface. The plurality of spokes are circumferentially disposed about the radially inner surface and extend radially inwardly from the radially inner surface.

19 Claims, 6 Drawing Sheets

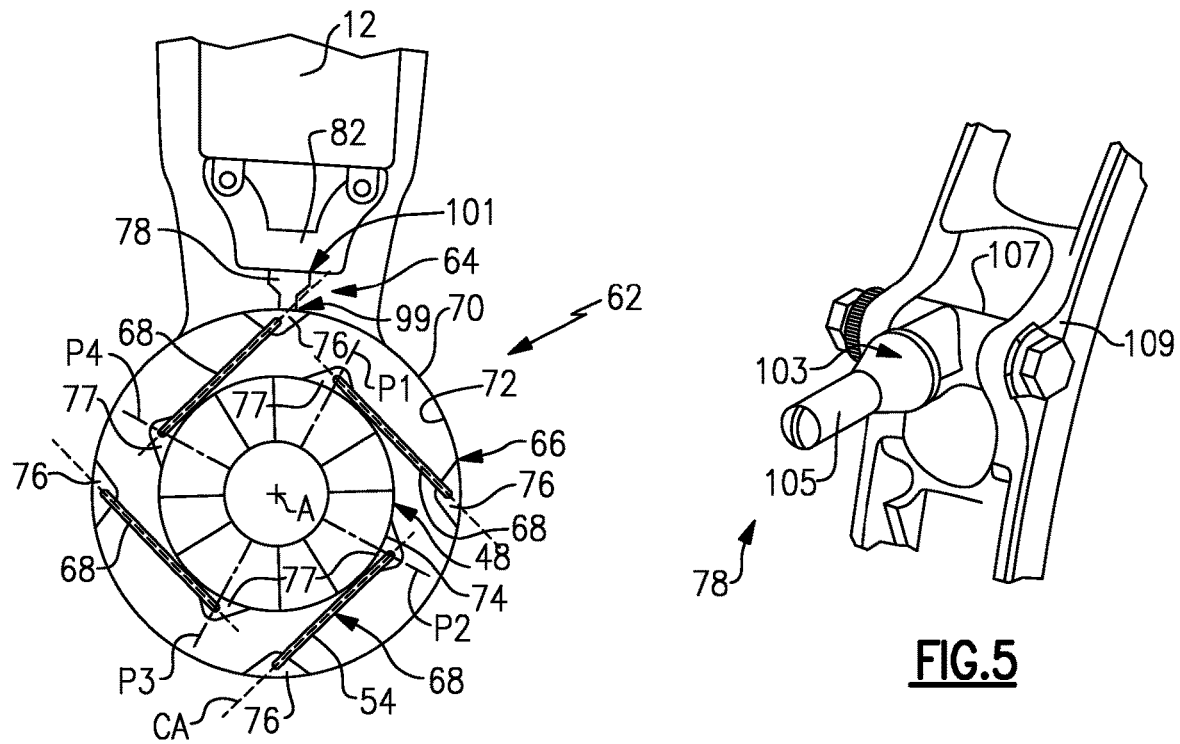
FIG.4
FIG.5
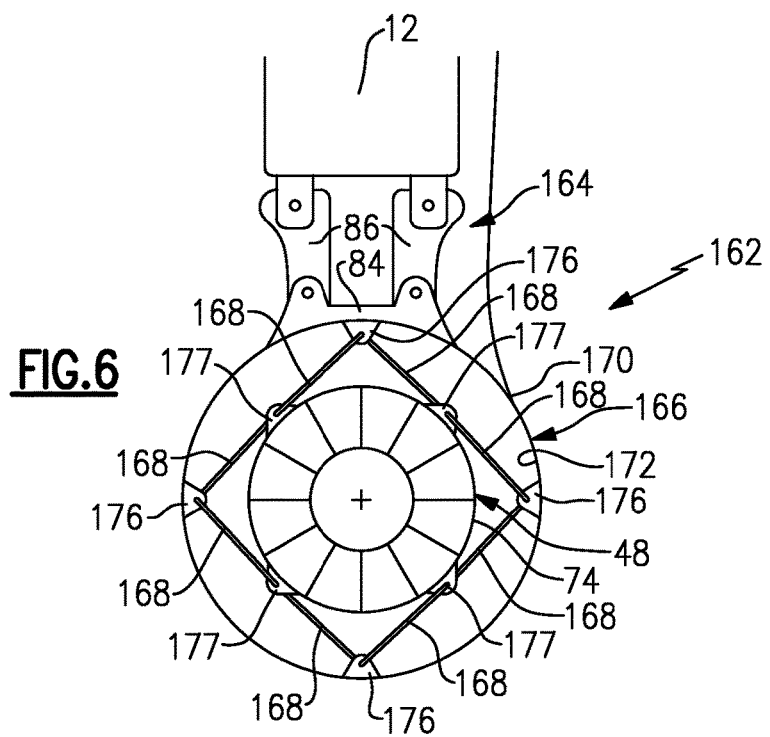
FIG.6

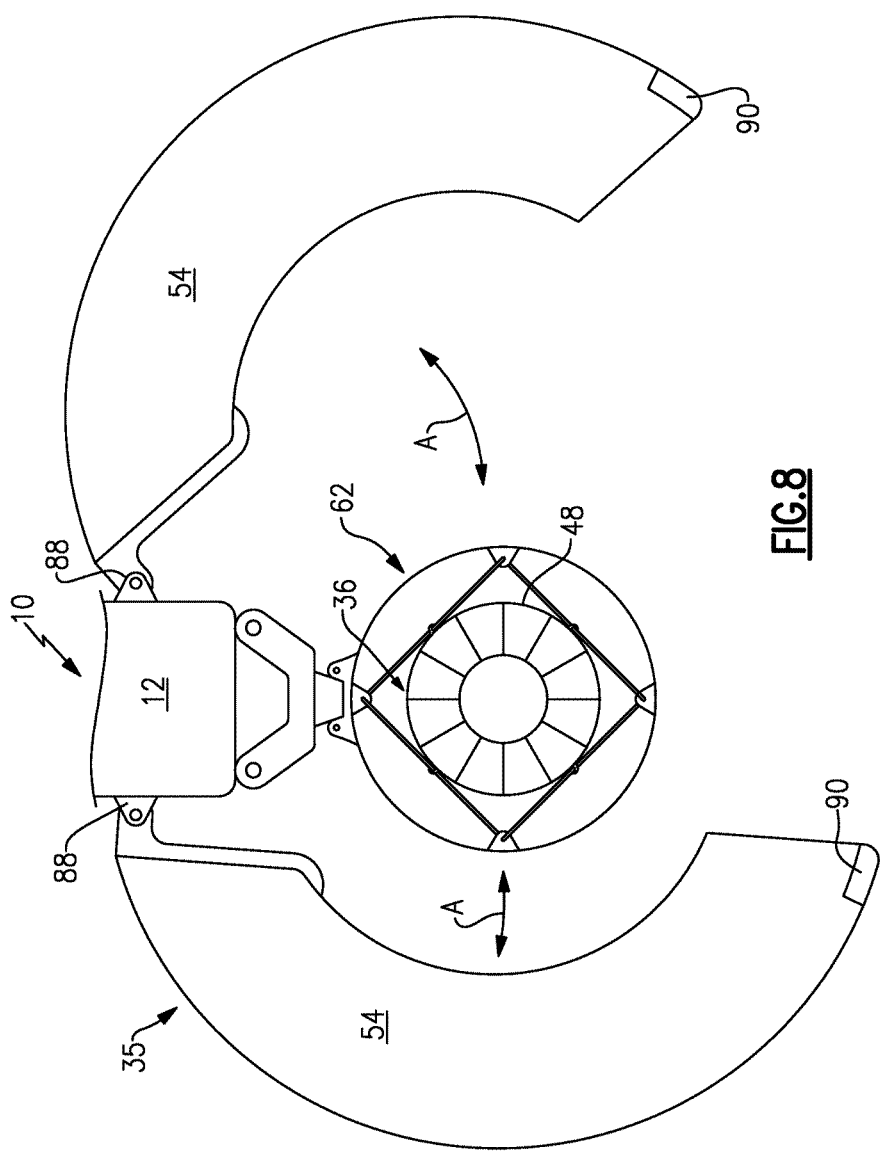

US 9,828,105 B2

NACELLE ASSEMBLY HAVING INTEGRATED AFTERBODY MOUNT CASE

BACKGROUND

This disclosure relates generally to a gas turbine engine, and more particularly to a nacelle assembly for a gas turbine engine that includes an integrated afterbody mount case.

Gas turbine engines, such as turbofan gas turbine engines, typically include a core engine having a fan section, a compressor section, a combustor section and a turbine section. During operation, air is pressurized in the compressor section and is mixed with fuel and burned in the combustor section. The hot combustion gases that are generated in the combustor section are communicated through the turbine section. The turbine section extracts energy from the hot combustion gases to power the compressor section, the fan section and other gas turbine engine loads.

The core engine components are housed by a core engine casing. The core engine casing is generally surrounded by a nacelle assembly that is annularly disposed about the core engine. The nacelle assembly and the core engine casing cooperate to assemble the gas turbine engine.

The gas turbine engine is connected to a pylon that extends from an aircraft provide gas turbine engine structure, such as an aircraft wing. A mounting assembly mounts the gas turbine engine between the pylon and the gas turbine engine casing. The mount assembly can include both front and rear mounts that react loads that are experienced by the gas turbine engine during operation.

SUMMARY

A nacelle assembly for a gas turbine engine includes an integrated afterbody mount case that includes an outer ring and a plurality of spokes. The outer ring includes a radially outer surface and a radially inner surface. The plurality of spokes extend radially inwardly from the radially inner surface and are circumferentially disposed about the outer ring.

In another exemplary embodiment, a gas turbine engine includes a pylon, a mount assembly connected to the pylon, a nacelle assembly, and a core engine casing. The nacelle assembly includes an integrated afterbody mount case that includes an outer ring having a radially outer surface connected to the mount assembly. Each of a plurality of spokes extend between a radially inner surface of the outer ring and the core engine casing.

In yet another exemplary embodiment, a method of isolating gas turbine engine loads includes positioning an integrated afterbody mount case of a nacelle assembly about a portion of a core engine casing. The gas turbine engine loads are reacted through the integrated afterbody mount case and are isolated from the core engine casing.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 illustrates a first example integrated afterbody mount case of a nacelle assembly.

FIG. 5 illustrates an example fitting of a mount assembly that can be used with the integrated afterbody mount case of FIG. 4.

FIG. 6 illustrates a second example integrated afterbody mount case of a nacelle assembly.

FIG. 8 illustrates a rear view of a gas turbine engine.

DETAILED DESCRIPTION

Figure 1:
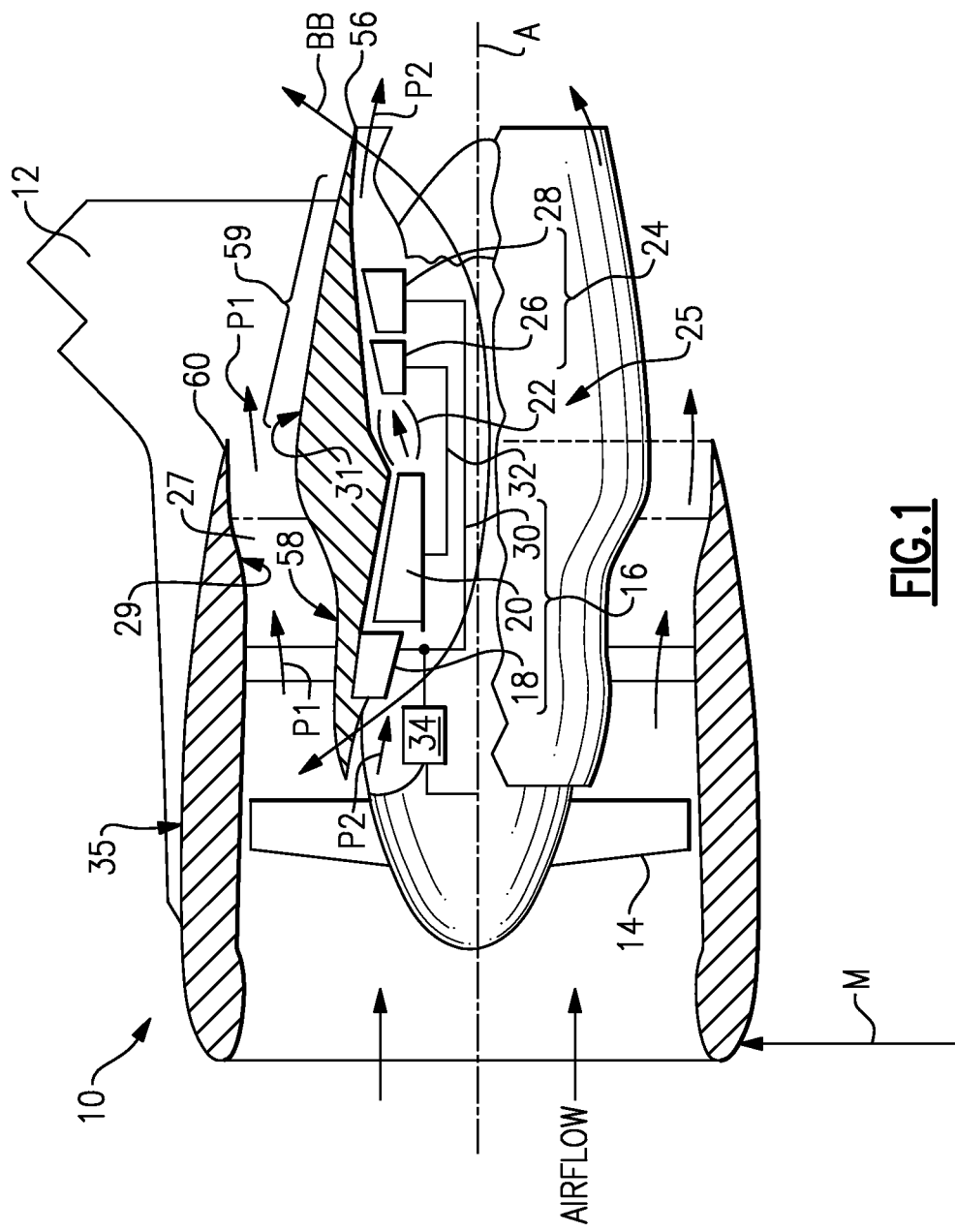
FIG. 1 schematically illustrates a gas turbine engine.

FIG. 1 illustrates a gas turbine engine 10 that is suspended from a pylon 12 as is typical of an aircraft designed for subsonic operation. The gas turbine engine 10 is depicted as a turbofan gas turbine engine. However, this disclosure is not limited to turbofan gas turbine engines.

The gas turbine engine 10 includes a core engine 25 having a fan section 14, a compressor section 16 (including a low pressure compressor 18 and a high pressure compressor 20), a combustor section 22, and a turbine section 24 (including a high pressure turbine 26 and a low pressure turbine 28). A low speed shaft 30 rotationally supports the low pressure compressor 18 and the low pressure turbine 28. The low speed shaft 30 also drives the fan section 14 either directly or through a gear train 34. A high speed shaft 32 rotationally supports the high pressure compressor 20 and the high pressure turbine 26. The low speed shaft 30 and the high speed shaft 32 rotate about a longitudinal centerline axis A of the gas turbine engine 10.

During operation, air is drawn into the gas turbine engine 10 by the fan section 14 and is pressurized in the compressor section 16. Fuel is mixed with pressurized air and burned in the combustor section 22. The combustion gases are discharged through the turbine section 24, which extracts energy from the gases to power the compressor section 16, the fan section 14 and other gas turbine engine loads.

A nacelle assembly 35 surrounds and protects the core engine 25 and provides a smooth flow surface for the airflow that is communicated through the gas turbine engine 10. The nacelle assembly 35 can also absorb gas turbine engine loads, such as aerodynamic bending moment loads M (i.e., loads perpendicular to the engine centerline axis A) and backbone bending loads BB (i.e., reaction of bending moment loads M through the core engine 25) experienced by the gas turbine engine 10 during operation. The aerodynamic bending moment loads M and backbone bending loads BB are shown schematically and are exaggerated in FIG. 1 to better illustrate these loads.

During operation, a first portion P1 of the airflow from the fan section 14 is delivered into a fan bypass duct 27. The fan bypass duct 27 extends between an outer flow surface 29 of the nacelle assembly 35 and an inner flow surface 31 of a core nacelle 58 of the nacelle assembly 35. The bypass airflow (the first portion P1 of the airflow) is discharged through a fan exhaust nozzle 60 and the core airflow (a second portion P2 of the airflow) is discharged through a core exhaust nozzle 56. The high bypass ratio (fan airflow to core airflow) of the gas turbine engine 10 increases mass flow and decreases exhaust nozzle velocity of the gas turbine engine 10.

This view is highly schematic and is included to provide a basic understanding of a gas turbine engine and not to limit the disclosure. This disclosure extends to all types of gas turbine engines and for all types of applications.

Figure 2:
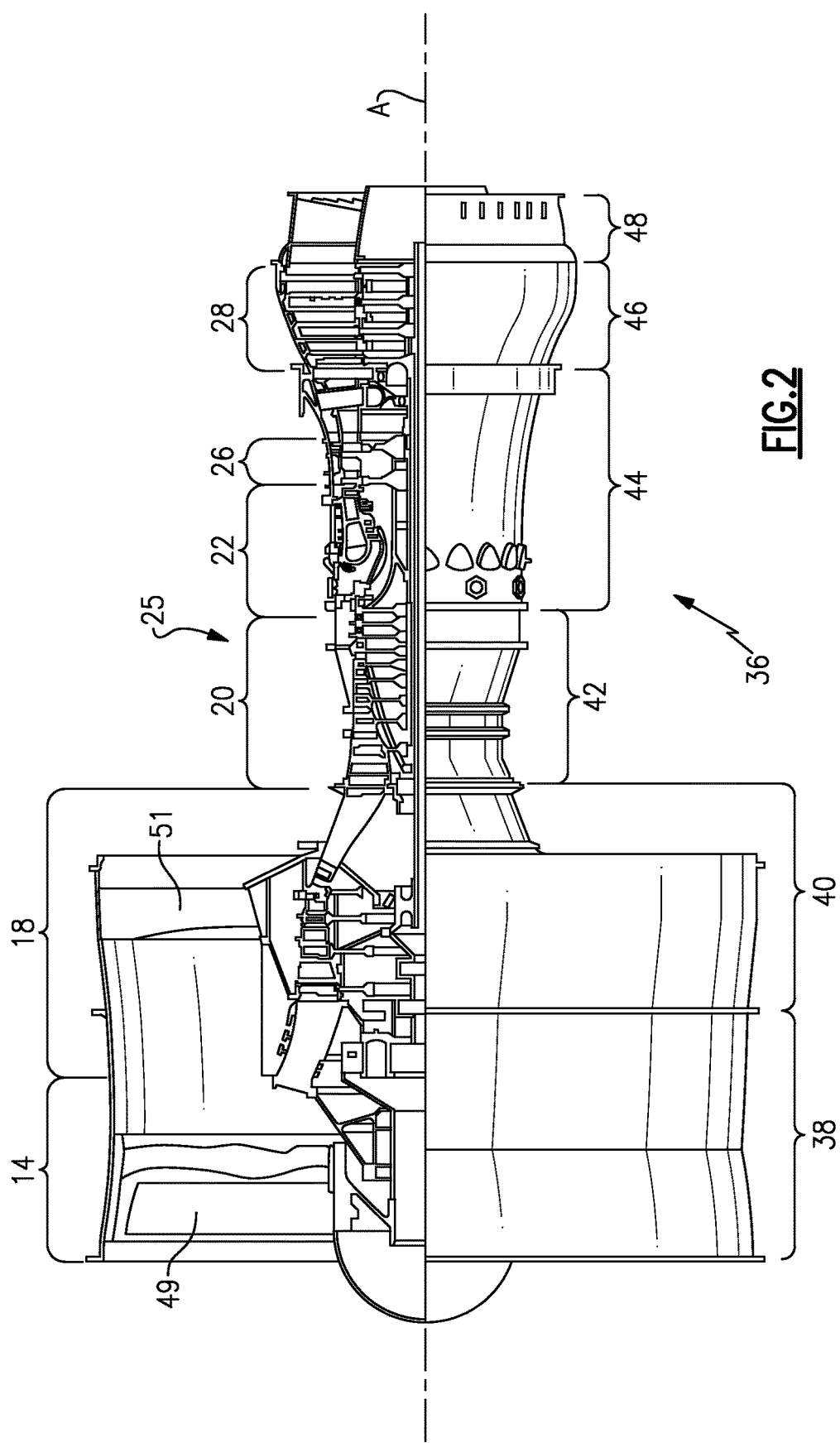
FIG. 2 illustrates a core engine casing of a gas turbine engine.

FIG. 2 illustrates a core engine casing 36 of the core engine 25 of the gas turbine engine 10. In this view, the portions of the nacelle assembly 35 are removed to better illustrate the features of the core engine casing 36. The core engine casing 36 generally includes a fan case 38, an intermediate case 40, a high pressure compressor case 42, a diffuser case 44, a low pressure turbine case 46 and a turbine exhaust case 48. The fan section 14 includes a plurality of circumferentially spaced fan blades 49 that are surrounded by the fan case 38. A plurality of fan exit guide vanes 51 are positioned downstream from the fan blades 49.

Figure 3A:
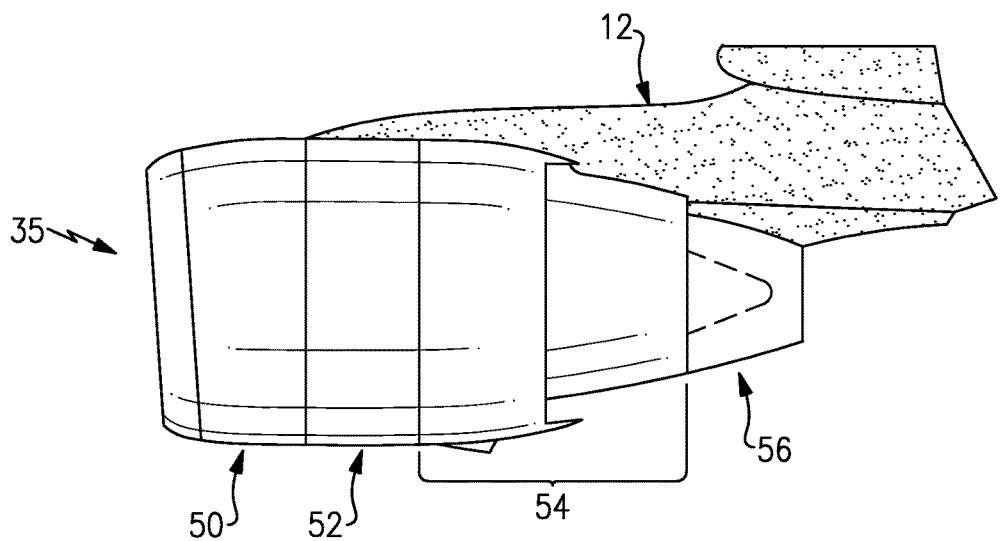
FIGS. 3A and 3B illustrate various aspects of a nacelle assembly that can be incorporated with a gas turbine engine.
Figure 3B:
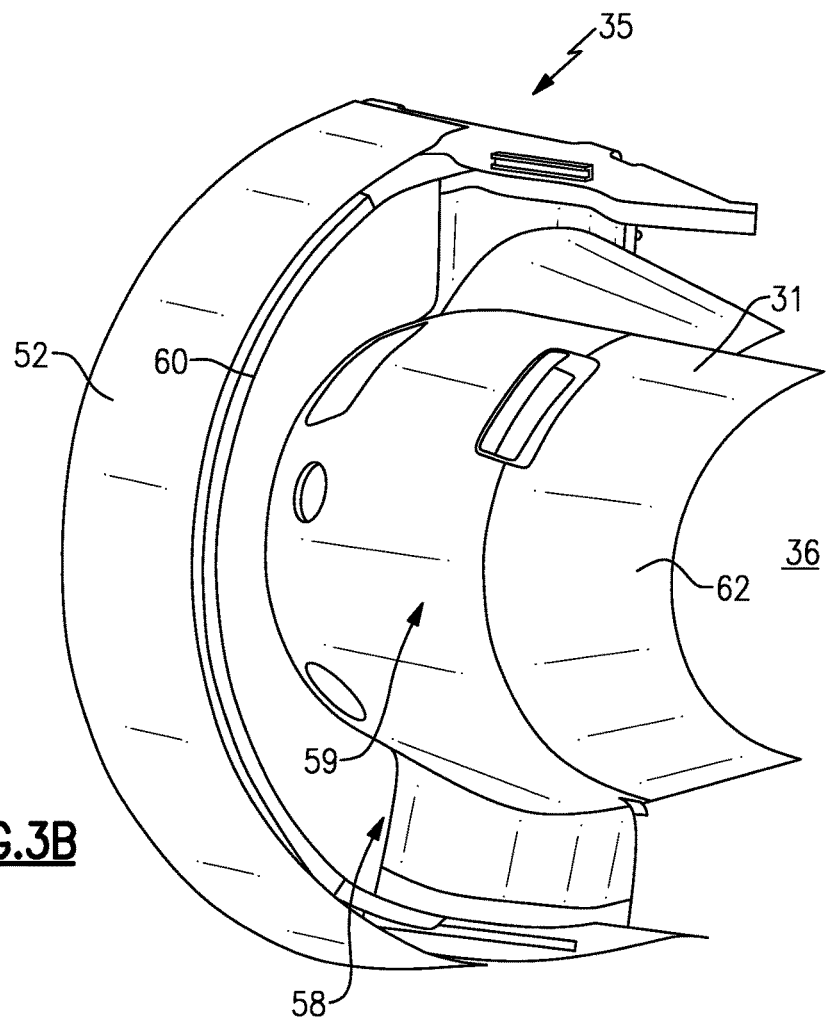

FIGS. 3A and 3B illustrate a nacelle assembly 35 of the gas turbine engine 10. The nacelle assembly 35 includes an inlet portion 50, a fan duct portion 52 positioned downstream from the inlet portion 50, thrust reversal doors 54 (i.e., D-duct portions) and a core exhaust nozzle 56.

Referring to FIG. 3B, the nacelle assembly 35 further includes a core nacelle 58 that is positioned radially inwardly from the fan duct portion 52 and the thrust reverser doors 54. In this example, portions of the fan duct portion 52 and the thrust reverser doors 54 are removed to better illustrate the features of the core nacelle 58. The core nacelle 58 annularly surrounds the core engine casing 36.

The core nacelle 58 includes an afterbody portion 59 that extends aft of a fan exhaust nozzle 60 (See also FIG. 1). In other words, the afterbody portion 59 represents the portion of the core nacelle 58 that establishes the inner flow surface 31 of the core nacelle 58.

The afterbody portion 59 includes an integrated afterbody mount case 62. The integrated afterbody mount case 62 can be connected to the afterbody portion 59 in any known manner, such as by using a V-blade hinged groove, for example. The integrated afterbody mount case 62 can be annularly disposed about any portion of the core engine 25 that is aft of the fan exhaust nozzle 60 to substantially isolate such portions from gas turbine engine loads, as is discussed in greater detail below.

FIG. 4 illustrates an exemplary implementation of the integrated afterbody mount case 62. In this example, the integrated afterbody mount case 62 is mounted between a mount assembly 64 and the turbine exhaust case 48 of the core engine casing 36. The mount assembly 64 can include a rear mount, a front mount or both (see FIGS. 7A and 7B).

The integrated afterbody mount case 62 includes an outer ring 66 that annularly surrounds the turbine exhaust case 48 and a plurality of spokes 68 that radially extend from the outer ring 66. The outer ring 66 can be made from a composite material, a graphite reinforced material or a metallic material of suitable strength and durability. The plurality of spokes 68 can be made from a metallic material, a high temperature composite material or other suitable material.

A contour of the outer ring 66 establishes the radially inner flowpath of the fan bypass duct 27. The outer ring 66 includes a radially outer surface 70 that interfaces with the mount assembly 64 and a radially inner surface 72 that interfaces with the plurality of spokes 68.

The plurality of spokes 68 are circumferentially disposed about the radially inner surface 72 of the outer ring 66 and connect between the radially inner surface 72 and an outer surface 74 of the turbine exhaust case 48. Four spokes 68 are illustrated; however, a greater or fewer number can be provided depending upon design criteria. The plurality of spokes 68 distribute the loads that act upon the turbine exhaust case 48 at discreet points P1, P2, P3 and P4 of the annular surface of the turbine exhaust case 48. The loads are isolated circumferentially through the plurality of spokes 68 and are communicated into the outer ring 66.

The plurality of spokes 68 connect between a first plurality of lugs 76 that are circumferentially disposed about the radially inner surface 72 of the outer ring 66 and a second plurality of lugs 77 circumferentially disposed about the outer surface 74 of the turbine exhaust case 48. The plurality of spokes 68 obliquely extend between the outer ring 66 and the turbine exhaust case 48 (i.e., centerline axes CA of the spokes 68 are obliquely oriented relative to a centerline axis A of the gas turbine engine 10). The plurality of spokes 68 can move in an axial direction (into and out of the page as shown in FIG. 4) in order to absorb deflections of the core engine 25.

The plurality of spokes 68 dampen vibrations and loads experienced at the turbine exhaust case 48 (or other portion of the core engine casing 36), but are lenient enough not to react such loads through the turbine exhaust case 48. In other words, the turbine exhaust case 48 is cantilevered relative to the integrated afterbody mount case 62 such that loads are reacted through the integrated afterbody mount case 62 and the mount assembly 64 to the pylon 12 rather than through the turbine exhaust case 48.

The radially outer surface 70 of the outer ring 66 of the integrated afterbody mount case 62 connects to the mount assembly 64 via a fitting 78. The fitting 78 is attached to the radially outer surface 70 of the outer ring 66 on a first side 99 and is attached to a linkage 82 of the mount assembly 64 at a second side 101. The linkage 82 connects the fitting 78 to the pylon 12. The linkage 82 can be either pinned or bolted relative to the pylon 12, or attached in any other known manner.

One example fitting 78 that can be used to attach the integrated afterbody mount case 62 to the pylon 12 is illustrated by FIG. 5. The fitting 78 includes a cone bolt fitting 103 having a T-shape that defines a first leg 105 and a second, transverse leg 107. The second, transverse leg 107 is attached to a mount ring 109. The first leg 105 attaches to the radially outer surface 70 of the outer ring 66 (See FIG. 4).

FIG. 6 illustrates another example integrated afterbody mount case 162 that can be provided integrally with the core nacelle 58 of the nacelle assembly 35. Similar to the integrated afterbody mount case 62, the integrated afterbody mount case 162 includes an outer ring 166 and a plurality of spokes 168 that extend between the outer ring 166 and a portion of the core engine casing 36 (in this example, the turbine exhaust case 48). The outer ring 166 includes a radially outer surface 170 and a radially inner surface 172.

The plurality of spokes 168 extend between the radially inner surface 172 and an outer surface 74 of the turbine exhaust case 48. In this example, the plurality of spokes 168 are arranged in a diamond shape such that the spokes 168 communicate the loads experienced by the turbine exhaust case 48 between the spokes 168 and the outer ring 166. The plurality of spokes 168 extend between a first plurality of lugs 176 disposed circumferentially about the radially inner surface 172 of the outer ring 166 and a second plurality of lugs 177 disposed about the outer surface 74 of the turbine exhaust case 48. One spoke 168 extends between one lug 176 of the outer ring 166 and a corresponding lug 177 of the turbine exhaust case 48. The spokes 168 can be pinned or bolted to the lug joints.

The radially outer surface 170 of the outer ring 166 includes a mount beam 84. The mount beam 84 interfaces with a mount assembly 164 to connect the integrated afterbody mount case 162 to the pylon 12. In other words, the mount beam 84 attaches between the radially outer surface 170 of the outer ring 166 and the mount assembly 164. In this example, the mount assembly 164 includes linkages 86 that extend between the pylon 12 and the mount beam 84 of the outer ring 66.

The integrated afterbody mount cases 62, 162 of FIG. 4 and FIG. 6 are but examples of potential afterbody segments and the depicted arrangements and locations of such examples are not limiting to this disclosure. In addition, these segments are not necessarily shown to the scale they would be in practice. Instead, these segments are enlarged to better illustrate their features and functions.

Figure 7A:
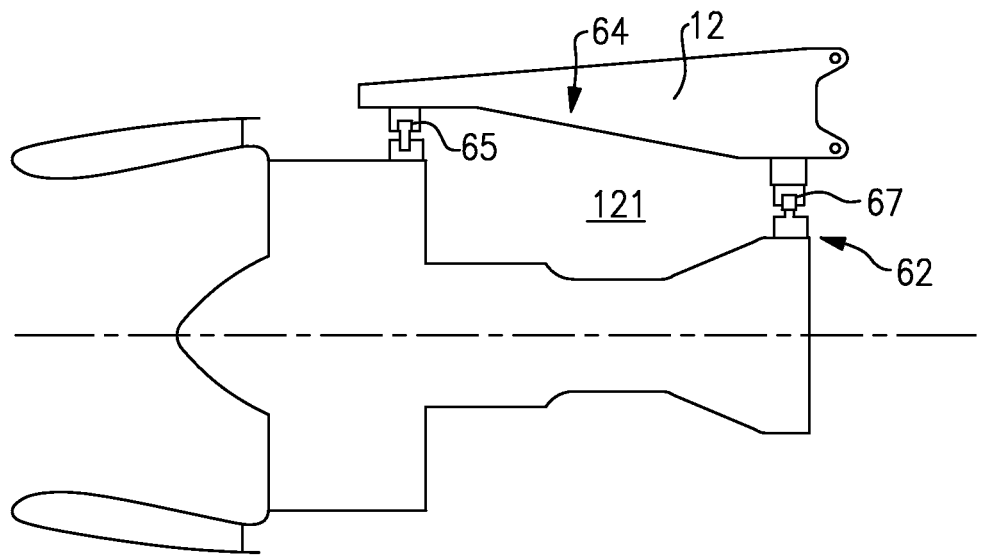
FIGS. 7A and 7B illustrate example mounting assemblies.

FIG. 7A illustrates a mount assembly 64 that can be incorporated to mount the integrated afterbody mount case 62. The mount assembly 64 includes a front mount 65 and a rear mount 67. The integrated afterbody mount case 62 is connected to the rear mount 67 of the mount assembly 64. In this example, thrust links are not necessary across a space 121 for reacting thrust loads.

Figure 7B:
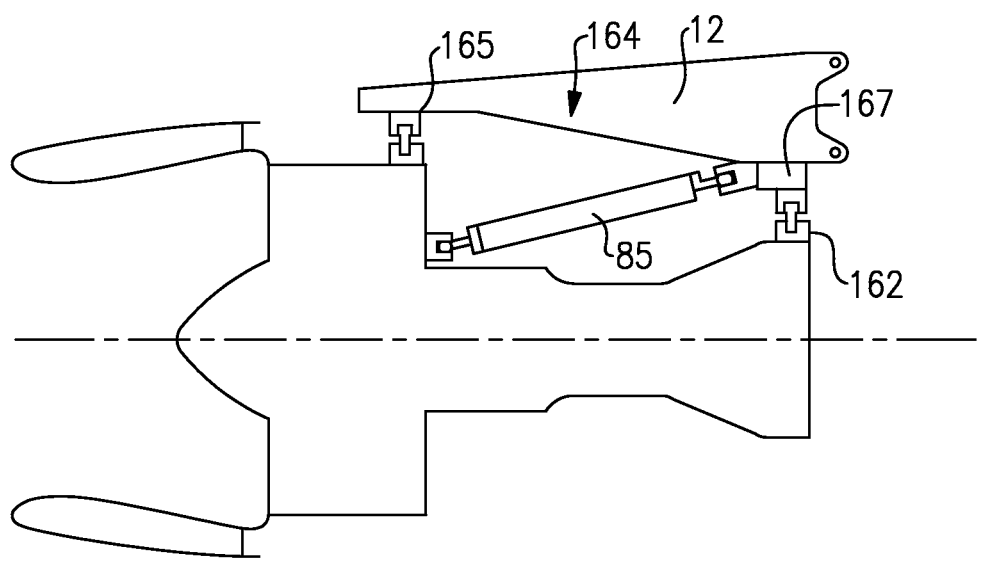

FIG. 7B illustrates a mount assembly 164 that can be incorporated to mount the integrated afterbody mount case 162. The mount assembly 164 includes a front mount 165 and a rear mount 167. The integrated afterbody mount case 162 is connected to the rear mount 167 of the mount assembly 164. In this case, the mount assembly 164 includes a thrust link 85 for reacting thrust loads.

FIG. 8 illustrates a rear view of a gas turbine engine 10. The turbine exhaust case 48, i.e., a portion of the core engine casing 36, is isolated from the loads of the gas turbine engine 10 via the integrated afterbody mount case 62. The thrust reverser doors 54 of the nacelle assembly 35 are hinged relative to the pylon 12 at hinge points 88. Opposite ends of the thrust reverser doors 54 are latched at latch beam 90. In this way, the thrust reverser doors 54 may be opened and closed in the direction of arrows A to provide access to the core engine 25, including access to the integrated afterbody mount case 62.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A nacelle assembly for a gas turbine engine, comprising:
   a fan exhaust nozzle;
   a core nacelle that includes an afterbody portion that extends aft of said fan exhaust nozzle and an integrated afterbody mount case connected to said afterbody portion, said integrated afterbody mount case including an outer ring having a radially outer surface and a radially inner surface; and
   a plurality of spokes that extend radially inwardly from said radially inner surface, wherein said plurality of spokes are circumferentially disposed about said outer ring.

2. The assembly as recited in claim 1, wherein said plurality of spokes are disposed in a diamond-shaped arrangement.

3. The assembly as recited in claim 1, wherein said plurality of spokes extend between said outer ring and a core engine casing.

4. The assembly as recited in claim 1, comprising a plurality of lugs disposed circumferentially about said radially inner surface of said outer ring.

5. The assembly as recited in claim 4, wherein at least one of said plurality of spokes is connected to at least one of said plurality of lugs.

6. A gas turbine engine, comprising:
   a pylon;
   a mount assembly connected to said pylon;
   a nacelle assembly including a fan exhaust nozzle, an afterbody portion that extends aft of said fan exhaust nozzle and an integrated afterbody mount case connected to said afterbody portion and that includes an outer ring and a plurality of spokes, wherein said outer ring includes a radially outer surface connected to said mount assembly and a radially inner surface; and
   a core engine casing, wherein each of said plurality of spokes extend between said radially inner surface of said outer ring and said core engine casing.

7. The gas turbine engine as recited in claim 6, wherein said core engine casing includes a turbine exhaust case.

8. The gas turbine engine as recited in claim 7, wherein each of said plurality of spokes extend between said radially inner surface and said turbine exhaust case.

9. The gas turbine engine as recited in claim 6, wherein said mount assembly includes a front mount and a rear mount.

10. The gas turbine engine as recited in claim 9, wherein said rear mount is attached between said integrated afterbody mount case and said pylon.

11. The gas turbine engine as recited in claim 6, comprising a fitting that attaches between said radially outer surface of said outer ring and said mount assembly.

12. The gas turbine engine as recited in claim 11, wherein said fitting includes a cone bolt fitting.

13. The gas turbine engine as recited in claim 6, comprising a mount beam that attaches between said radially outer surface of said outer ring and said mount assembly.

14. A method of isolating gas turbine engine loads, comprising the steps of:
   positioning an integrated afterbody mount case of a nacelle assembly about a portion of a core engine casing, the integrated afterbody mount case connected to an afterbody portion that extends aft of a fan exhaust nozzle of the nacelle assembly; and
   reacting the gas turbine engine loads through the integrated afterbody mount case to isolate the core engine casing from the gas turbine engine load.

15. The method as recited in claim 14, wherein the step of positioning the integrated afterbody mount case includes disposing the integrated afterbody mount case annularly about a turbine exhaust case of the core engine casing.

16. The method as recited in claim 14, wherein the step of positioning the integrated afterbody mount case includes the steps of:
   positioning an outer ring about the core engine casing; and
   extending a plurality of spokes between a radially inner surface of the outer ring and a radially outer surface of the core engine casing.

17. The method as recited in claim 14, wherein the step of reacting the gas turbine engine loads includes reacting the gas turbine engine loads through a mount assembly and a pylon of the gas turbine engine.

18. The assembly as recited in claim 1, comprising a fitting that attaches between said radially outer surface of said outer ring and a mount assembly that connects to a pylon, wherein said fitting includes a cone bolt fitting.

19. The assembly as recited in claim 1, wherein said integrated afterbody mount case is connected to said afterbody portion with a V-blade hinged groove.

* * * * *